United States Patent [19]
Scofield et al.

[11] Patent Number: 5,510,612
[45] Date of Patent: Apr. 23, 1996

[54] WIRING BASE FOR PHOTOELECTRIC SCANNING UNIT

[75] Inventors: Robert E. Scofield, Pewaukee; Richard Molus, Greenfield; Donald L. Ness, Brown Deer, all of Wis.

[73] Assignee: Allen-Bradley Company, Inc., Milwaukee, Wis.

[21] Appl. No.: 235,618

[22] Filed: Apr. 29, 1994

[51] Int. Cl.[6] .................................................. G06K 7/12
[52] U.S. Cl. ......................... 250/239; 250/566; 361/679
[58] Field of Search .................................... 250/566, 568, 250/239, 234; 235/454, 462, 470; 361/600, 679, 816, 823

[56] References Cited

U.S. PATENT DOCUMENTS

| | | | |
|---|---|---|---|
| 4,603,261 | 7/1986 | Robertson et al. | 250/566 |
| 4,716,493 | 12/1987 | Zelkowitz | 361/816 |
| 4,968,883 | 11/1990 | Leyshon et al. | 250/239 |
| 5,034,856 | 7/1991 | Cook et al. | 361/816 |
| 5,249,097 | 9/1993 | Bassin | 361/600 |
| 5,396,062 | 3/1995 | Eisentraut et al. | 250/239 |

*Primary Examiner*—Stephone B. Allen
*Attorney, Agent, or Firm*—Keith M. Baxter; John J. Horn; George A. Montanye

[57] ABSTRACT

A wiring base for a bar code scanner or the like provides a conductive housing open at one face for connecting cables at various screw terminals to a circuit board providing signal processing for the signals and permitting various different-connections of the cables. The shields of the cables pass into the conductive housing to be terminated on conductive housing thereby enlisting the conductive housing as a shield around all the cables. Attachment of the scanning head to the upper face of the wiring base closes the housing to be free from the egress of dust or liquid and completes a Faraday cage around the connections while connecting two multi-pin connectors one within the base and one within the scanner, communicating the signals to the scanner. A visual indicator attached within the conductive housing indicates the presence of power and its polarity prior to connection of the scanning head to the conductive housing.

9 Claims, 2 Drawing Sheets

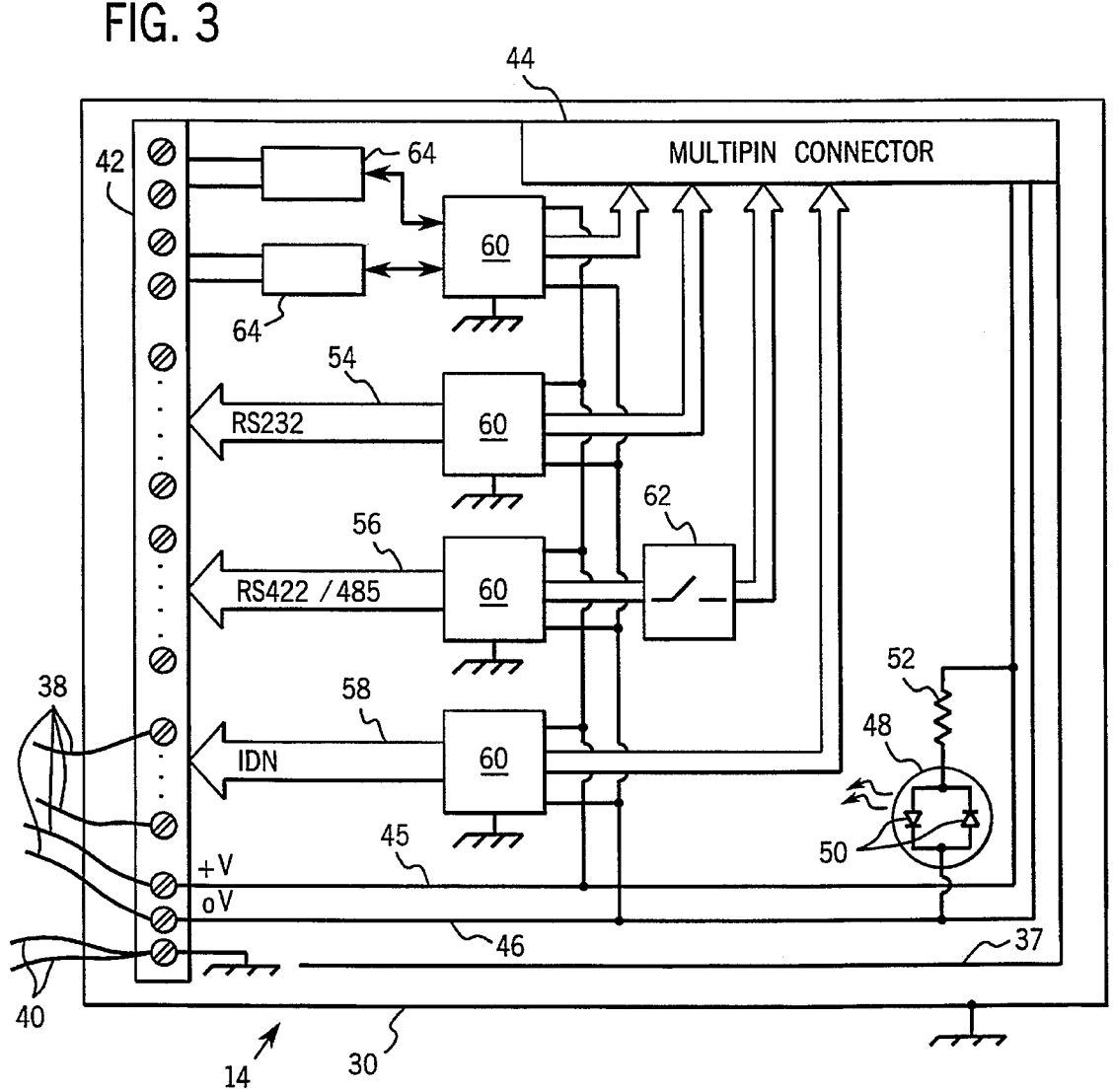

WIRING BASE FOR PHOTOELECTRIC SCANNING UNIT

BACKGROUND OF THE INVENTION

1. Field of the Invention

The present invention relates to a detachable wiring base for use with a photoelectric scanner or the like.

2. Background Art

Printed, machine readable bar codes, made up of varying widths of parallel black lines on a white field, may be used to identify products during their manufacture. These bar codes are typically read by a stationary bar code reader which sweeps the printed bar code with a focussed laser beam and detects the reflected light. Stationary bar code readers are particularly well suited for assembly line applications because they require no contact with the moving product and, by using a sweeping beam, are largely indifferent to the relative motion between the product and the bar code scanner.

The reflected light from the swept beam is detected by a photoelectric detector within the bar code reader and converted to electrical code signals. The bar code scanner interprets the thickness and pattern of lines of the bar code as digits and performs rudimentary error correction of the resulting code signals prior to transmitting them on data lines. For sophisticated assembly line systems, under the control of an industrial processor, the bar code reader may communicate the code signals directly with an industrial processor along a high speed serial data link.

Alternatively, simple control signals may be provided by the bar code reader to other equipment, such sorting machinery or mechanical gates on an assembly line, for direct control of these devices.

The bar code reader may also receive simple control signals from other equipment, for example, signals indicating that scanning should be undertaken because a bar coded product is present. These signals may come, for example, from a separate photodetector immediately upstream along the assembly line of the stationary bar code reader.

Finally, the bar code reader must receive a source of electrical power for operation of the scanning mechanism and associated electronics.

Each of these signals is typically associated with different electrical cables, different ones of which must be attached to the bar code reader depending on its application.

Typically the bar code reader will be attached to a structure fixed relative to the assembly line path so that its optical alignment may be ensured. The various cables and conductors attached to the bar code reader are then attached to screw terminals on the body of the bar code reader so that alignment tests may be performed and the system may be verified. In addition, screw terminals allow the wires to be pulled through conduit protecting the wiring from fraying or other damage. Unlike multi-pin connectors, these screw terminals provide maximum flexibility to the customer in selecting which of various possible connections are desired for the particular application and do not require the manufacture of custom connector cables in the field. However, such individual screw terminal connections often admit noise, compromising the integrity of the data to be communicated by the bar code reader. The multiple screw terminal connections also make removal of the bar code reader difficult because each conductor of each cable must be individually disconnected. For this reason, and because removal of the bar code reader also causes the alignment of the bar code reader to be lost, the bar code reader is normally kept in place during subsequent testing and assembly of the equipment.

During the period after installation of the bar code reader but prior to operation of the associated equipment, the bar code reader is at risk of damage. The window through which the scanning beam passes may be scratched or broken and the mechanical scanning apparatus within the bar code reader may be jarred and damaged. The loss of alignment of the reader and necessary disconnection and reconnection of a large number of conductors, incident to removing the reader, also hampers replacement of a damaged bar code reader.

SUMMARY OF THE INVENTION

The present invention provides a detachable wiring base for a bar code reader holding wire terminals that offer flexibility in connecting various lines to the bar code reader and provides a foundation allowing removal of the scanner mechanism in such a way that when the bar code reader is re-attached to the base, its alignment is predetermined. The base and the reader together form a Faraday cage which provides a high degree of noise immunity from the resulting connection.

Specifically, the wiring base includes a conductive housing having walls surrounding a volume, at least one wall having a hole sized to admit a cable with a shield and conductive wires. First wire terminals, adapted to connect to the wires, are mechanically affixed to the conductive housing within the volume but are electrically insulated from the conductive housing. At least one second wire terminal adapted to connect to the shield is mechanically fixed to the conductive housing within the volume and electrically connected to the conductive housing. An alignment guide fixed to the conductive housing is adapted to receive a housing of the optical sensor along an insertion axis and to hold the optical sensor at a predetermined orientation with respect to the conductive housing whereby the orientation of the optical sensor when affixed to the conductive housing is uniquely determined by the orientation of the conductive housing. An electrical connector having conductors electrically communicating with the first wire terminals is mechanically attached to the conductive housing to receive a mating connector of the optical sensor along the insertion axis when the optical sensor is affixed to the conductive housing. The conductive wiring base includes mounting means for mounting the conductive housing and a predetermined orientation with respect to a structure fixed relative to the desired optical axis of the optical sensor. The conductive housing forms at least part of a Faraday cage around the first and second wire terminals when the housing of the optical sensor is in position on the conductive housing.

Thus, it is one object of the invention to provide a wiring base that allows simple termination of an arbitrary number of cables connected to an optical sensor with a high degree of noise immunity and that allows easy removal of the optical sensor for protection or replacement. The provision of a shield terminal invokes the entire housing as a shield thus permitting a simple connection of the conductors of the desired cables to wire terminals held within the housing. The mating electrical connectors make subsequent removal of the optical sensor a simple matter of unplugging it.

It is another object of the invention to provide a means of installing an optical sensor with custom cabling configurations. The use of the conductive housing permits the termination of the cables to be done with screw type terminals so that each conductor may be individually configured without the need to manufacture a special cable with connectors in the field.

The first terminals of the wiring base may connect to wires carrying data signals having either a first or second format. The wire terminals include a first set and second set of wire terminals, the first set adapted exclusively to receive data signals of the first format and the second set adapted exclusively to receive data signals of the second format.

Thus another object of the invention is to provide a means for connecting a standardized bar code reader to data from a variety of different communication formats, and yet to preserve the above stated ability to disconnect and reconnect rapidly.

At least two of the first wire terminals may be adapted to electrically connect to an electrical power source and the wiring base may include, in addition, a visual indicator attached to the conductive housing and the two wire terminals to provide a visual indication of the presence of electrical power.

Thus, it is another object of the invention to permit the base to be wired and tested for power prior to the installation of the reader.

The wiring base may have a single open face providing access to the wire terminals and the alignment guide may be positioned with respect to the open face so that the open face is closed by the housing of the optical sensor when the housing of the optical sensor is affixed to the conductive housing and wherein electrical contact is established between the conductive housing and the housing of the optical sensor.

Thus it is another object of the invention to provide a single piece wiring base that provides a large area of access to the wire terminals for easy wiring but that provides a high degree of shielding when the optical sensor is in place, with a gasket seal that still allows maintenance of Faraday shield by metal-to-metal compression.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

BRIEF DESCRIPTION OF THE DRAWINGS

FIG. 3 is a simplified schematic block diagram of the circuit card shown in FIG. 2.

DETAILED DESCRIPTION OF THE PREFERRED EMBODIMENT

Figure 1:
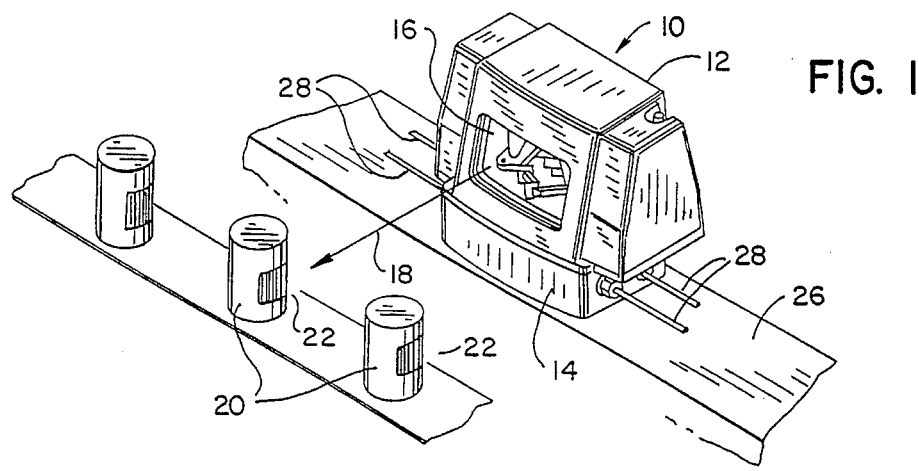
FIG. 1 is a perspective view of a stationary bar code reader mounted on the wiring base of the present invention as attached to structure of a conveyor line showing the axis of sensitivity of the bar code reader.

Referring to FIG. 1, a stationary bar code reader 10 includes a scanning head 12 and a wiring base 14. The scanning head includes a window 16 admitting light along an optical axis 18 that may be directed towards manufactured product 20 having bar codes 22. The product 20 is positioned on a conveying unit 24 so as to pass within a region crossing the optical axis 18 so that the bar codes 22 may be read.

The scanning head 12 is generally affixed to a top of the wiring base 14 as will be described below. The wiring base 14 is rigidly attached to structure 26 associated with the conveying unit 24 so as to maintain the orientation of the optical axis 18 with respect to the conveying unit 24 when the scanning head 12 is attached to the wiring base 14.

One or more electrical cables 28 attached to the wiring base 14 provide power, data and other input and output signals to the scanning head 12 via the wiring base 14 as will be described.

Figure 2:
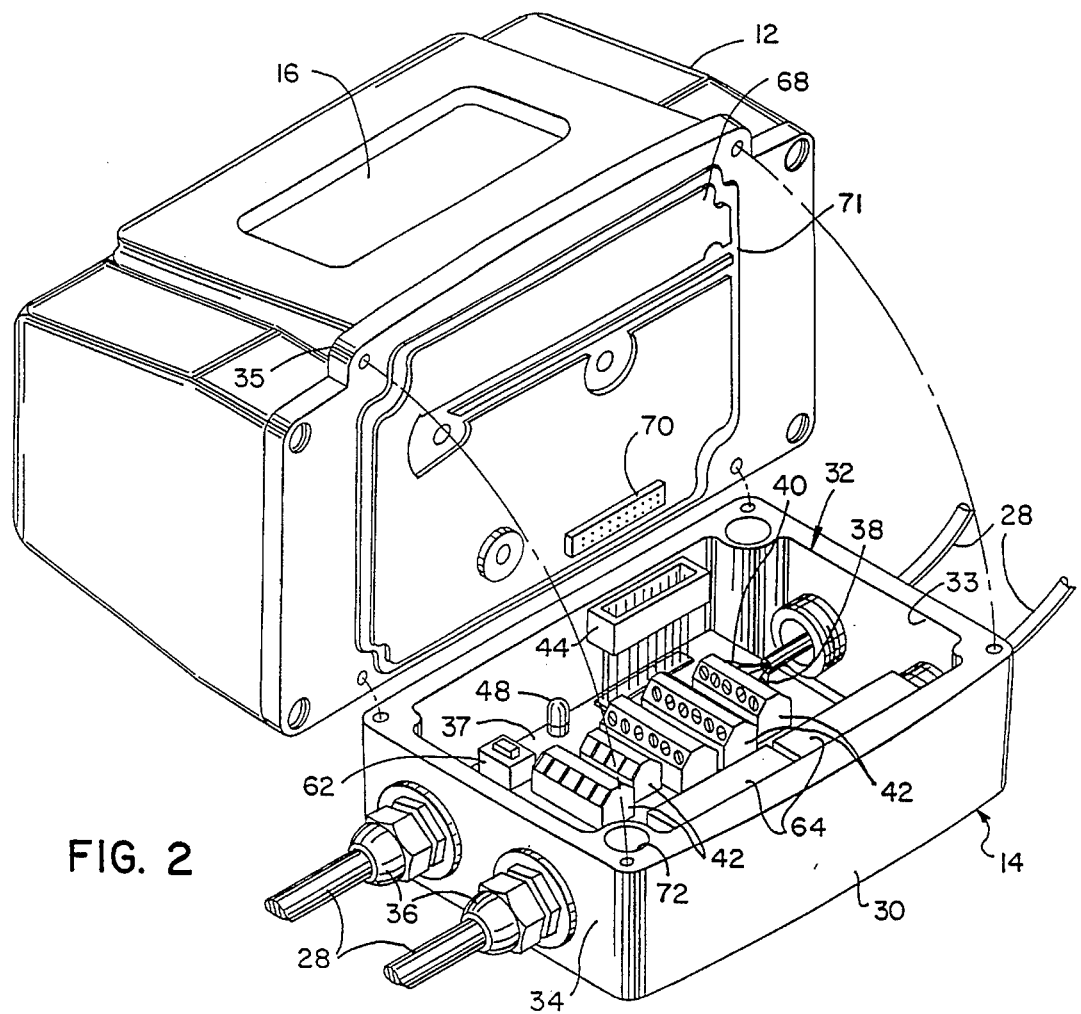
FIG. 2 is an exploded perspective view of the wiring base and the bottom side of the stationary bar code reader of FIG. 1 showing the mutual alignment of these two components bringing about the mating of two halves of a multi-pin connector, and showing the connection circuit card of the wiring base.

Referring now to FIG. 2, the wiring base 14 has an electrically conductive housing 30 generally in the form of a five-sided box having an open upper face 32 and defining a an inner volume. The housing 30 is preferably constructed of zinc or aluminum although other conductive materials may also be used.

Opposed left and right upstanding sidewalls 34 of the conductive housing 30 are pierced with holes to admit the threaded ends of cable retainers 36 which retain cables 28 coaxially within internal bores of the cable retainers 36 so that conductors 38 and a shield 40 of the cables 28 may pass into the volume of the conductive housing 30 with the cable 28 physically restrained by the cable retainers 36.

Also within the volume of the conductive housing 30 and affixed to the bottom wall of the conductive housing 30 is a circuit card 37 having on its upper surface blocks of screw terminals 42 for electrically connecting to the shield 40 and conductors 38 by means of captive machine screws according to techniques well known in the art. The screw terminals 42 provide an electrical junction between the conductors 38 and the shield 40 to various other components within the wiring base 14 via electrical traces (not shown) on the circuit card 37.

The circuit card 37 also holds a light emitting diode ("LED") assembly 48 for indicating the presence of power to the wiring base 14, a switch 62 used to terminate certain data lines, and an upstanding multi-pin connector 44 for receiving a mating connector 70 along a generally vertical insertion axis. Each will be described further below.

Referring now to FIGS. 2 and 3, the screw terminals 42 allow for various connections between conductors 38 and the multi-pin connector 44 which connects to the scanning head 12 as will be described. One screw terminal 42 permits each shield 40 to be connected electrically to the conductive housing 30. A portion of the cable 28 and the shield 40 pass within the volume of the conductive housing 30 and thus the connection of the shields 40 to the conductive housing 30 enlists the entire conductive housing 30 as a shield for the signals on cables 28.

Two of the conductors 38 of one cable 28 provide electrical power for the scanning head 12 and voltage references for protection circuits contained on the circuit card 37 to be described below. This electrical power is received on a positive power trace 45 and a ground trace 46 on the circuit card 37, each isolated from the shield 40 and the conductive housing 30. The positive power trace 45 and ground trace 46 are connected to separate pins on the multi-pin connector 44 for use also by the circuitry of the scanning head 12.

Positive power trace 45 and ground trace 46 are shunted by the LED assembly 48 comprising two back-to-back, parallel connected, light emitting diodes 50, one red and one green, together in series with a dropping resistor 52 to provide an indication of the polarity of voltage connected to the positive power trace 45 and ground trace 46 and the existence of power on the positive power trace 45 and ground trace 46. When the polarity of power applied to these two traces 45 and 46 is correct, the green LED 50 will be illuminated. If the power is connected but the polarity reversed, the red LED 50 will be illuminated. And if there is no power, neither LED 50 will be illuminated. Thus, the connection of power to the wiring base 14 may be readily verified prior to attachment of the scanning head 12.

Other screw terminals 42 allow connection of other conductors 38 to other pins of the multi-pin connector 44 associated with various digital communication channels. In particular, a number of screw terminals 42 are assigned to traces on the circuit card 37 associated with three formats of serial data communication. Specifically, traces 54 are associated with the RS232 communication protocol, traces 56 are associated with either the RS422 or the RS485 communication protocol, and traces 58 are associated with an industrial communication interface: IDN. Each of these communication interfaces have similar functionality and typically the user of the stationary bar code reader 10 will connect conductors 38 to only one of these traces 54 through 58.

Circuit card 37 also includes signal processing circuitry 60 for limiting the introduction of noise onto the digital communications of these traces 54 through 58. In particular, each of the traces 54 through 58 is received by signal processing circuitry 60 which shunts the individual traces to the conductive housing 30 by means of a small capacitor thereby limiting the amplitude of high frequency noise components relative to the conductive housing 30. Each signal processing circuit 60 also limits the voltage on the traces 54 through 58 by means of diodes connected between a given trace and the positive power trace 45 and the ground trace 46 so as to shunt any voltages greater than that on the positive power trace 45 or less than that on the ground trace 46 to the power supply as is well understood in the art.

After passing through the signal processing circuitry, the traces 56 are received by a switch 62 which electrically terminates the traces 56 with passive components if required by the topology of the network to which the wiring base 14 is attached. Such termination is well known in the art. After signal processing by signal processing circuitry 60 and for traces 56, possible termination by switch 62, the traces 54 through 58 are received by particular pins of the multi-pin connector 44.

Certain other pins of the multi-pin connector 44 are connected through signal processing circuitry 60 to solid state relays 64 which permit low level signals from the scanning head 12 to control relatively high current, high voltage AC or DC through outputs of the solid state relay 64 also connected to screw terminals 42 and which permit high current, high voltage AC or DC inputs from other equipment to be converted to low level signals compatible with the circuitry of the scanning head 12. Thus the solid state relays 64 permit some local input and output by the stationary bar code reader 10 such as may be used to inform the reader that a product 20 is coming into range or to trigger external equipment based on the bar code 22 read.

Each of the items on circuit card 37 are contained within the volume defined by the conductive housing 30 to receive significant shielding against electromagnetic and radio frequency interference.

Referring again to FIG. 2, the upper farce 32 of the conductive housing provides a lip 33 formed of the vertical inner edges of the upstanding sidewalls 34 and front and back wall of the conductive housing 30. This lip 33 is used as an alignment guide which receives a mating rib 68 protruding from the lower surface of the scanning head 12 and fitting within the lip 33 so as to insure a single unique alignment between the scanning head 12 and the wiring base 14 when the lower surface of the scanning head 12 abuts the upper face 32 of the wiring base 14. An elastomeric gasket 71 surrounds the rib 68 to provide a hermetic seal of the base 14 to the scanning head 12 yet providing metal-to-metal contact sufficient to preserve the Faraday shield of the connected base and head. The scanning head 12 is attached to the wiring base 14 by machine screws (not shown) passing through holes in peripheral flanges 35 and received by corresponding tapped holes in the upper face 32 of the wiring base 14. When the scanning head 12 is so placed against the wiring base 14, a mating multi-pin connector 70 electrically connects with the multi-pin connector 44 providing an electrical path between the wiring base 14 and the scanning head 12 and more particularly providing signals from the various screw terminals 42 as processed by signal processing circuitry 60 to the scanning head 12. The particular signals depend on the particular conductors 38 selected by the user.

The lower face of the scanning head 12 abutting the upper face 32 of the wiring base 14 is also conductive so that together the lower face of the scanning head 12 and the conductive housing 30 form a Faraday shield providing an extremely high degree of resistance from external magnetic and electric fields.

Holes 72 counter board vertically in opposing walls 34 of the conductive housing 30 may be used to attach the conductive housing 30 to the structure 26 of the assembly line or the like (shown in FIG. 1). Thus, it will be understood that the wiring base 14 may be securely attached to structure 26 during connection of the various cables 28. Further that the power connections may be verified by means of the LED assembly 48 at the time of the connection of the wiring base 14 to the structure 26 prior to installation of the scanning head 12.

Connection of the cables 28 to the various screw terminals 42 within the wiring base 14 is facilitated by the open upper surface of the wiring base 14. When the scanning head 12 is attached to the wiring base 14, it closes and shields the conductive housing 30. The stationary bar code reader 10 may then be accurately aligned so that the optical axis 18 is directed as desired. After this alignment, the scanning head 12 may be removed to be reinstalled only upon initial commissioning of the equipment.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A wiring base for use with an optical sensor receiving light along an axis of sensitivity with respect to a structure, the wiring base comprising:

a conductive housing having walls surrounding a volume, at least one wall having a hole sized to admit a cable having a shield and conductive wires;

a plurality of first wire terminals adapted to electrically connect to the wires, the first wire terminals mechanically affixed to the conductive housing within the volume but electrically insulated from the conductive housing;

at least one second wire terminal adapted to electrically connect to the shield and mechanically affixed to the conductive housing within the volume and electrically connected to the conductive housing;

an alignment guide affixed to the conductive housing and adapted to receive a housing of the optical sensor along an insertion axis and to hold the optical sensor in a predetermined orientation with respect to the conductive housing whereby the orientation of the optical sensor when affixed to the conductive housing is uniquely determined by the orientation of the conductive housing;

an electrical connector having conductors electrically communicating with the first wire terminals, the connector mechanically attached to the conductive housing to receive a mating connector of the optical sensor along the insertion axis when the optical sensor is affixed to the conductive housing;

mounting means for mounting the conductive housing in a predetermined orientation with respect to the structure; and whereby the conductive housing forms at least a part of a Faraday cage around the first and second wire terminals when the housing of the optical sensor is in position on the conductive housing.

2. The wiring base as recited in claim 1 including additional signal processing circuitry within the volume and electrically connected to the first wire terminals for limiting electrical signals received by the first wire terminals.

3. The wiring base as recited in claim 2 wherein at least one first wire terminal is adapted to electrically connect to a constant voltage source and wherein the signal processing circuitry limits the electrical signals with respect to the constant voltage source.

4. The wiring base as recited in claim 2 wherein the signal processing circuitry limits the high frequency content of the electrical signals.

5. The wiring base as recited in claim 1 wherein the first wire terminals are adapted to electrically connect to wires carrying data signals having one of a first and second format and wherein the first wire terminals include a first and second set, the first set adapted to receive data signals of the first format and the second set adapted exclusively to receive data signals of the second format.

6. The wiring base as recited in claim 1 wherein the first wire terminals are adapted to electrically connect to wires carrying data signals having one of a first and second format and wherein the first wire terminals are electrically connected through a switch held in the volume to the conductors of the electrical connector, the switch adapted to alter the connections of the first wire terminals to electrically terminate the wires carrying data signals.

7. The wiring base as recited in claim 1 wherein at least two of the first wire terminals are adapted to electrically connect to an electrical power source and wherein the wiring base includes a visual indicator attached to the conductive housing and the two wire terminals to produce a visual indication of the presence of electrical power.

8. The wiring base as recited in claim 1, wherein the conductive housing has a single open face providing access to the wire terminals and wherein the alignment guide is in position with respect to the open face so that the open face is closed by the housing of the optical sensor when the housing of the optical sensor is affixed to the conductive housing and wherein electrical contact is established between the conductive housing and the housing of the optical sensor.

9. The wiring base of claim 8, wherein the alignment guide includes means for abutting an elastomeric gasket to seal the volume when the open face is closed by the housing of the optical sensor and wherein the holes in the conductive housing are fitted with seal and sealing means at wire entry holes to seal the holes when cables are admitted therethrough.

\* \* \* \* \*